(12) United States Patent
Aznar

(10) Patent No.: US 7,776,220 B2
(45) Date of Patent: Aug. 17, 2010

(54) PRE-FILLED COLUMNS FOR FLASH CHROMATOGRAPHY WITH HIGHER SEPARATING EFFICIENCY

(75) Inventor: Pascal Aznar, Le Vesinet (FR)

(73) Assignee: Teledyne Isco, Inc., Lincoln, NE (US)

( * ) Notice: Subject to any disclaimer, the term of this patent is extended or adjusted under 35 U.S.C. 154(b) by 549 days.

(21) Appl. No.: 10/536,853

(22) PCT Filed: Nov. 29, 2002

(86) PCT No.: PCT/FR02/04115

§ 371 (c)(1),
(2), (4) Date: May 27, 2005

(87) PCT Pub. No.: WO2004/051257

PCT Pub. Date: Jun. 17, 2004

(65) Prior Publication Data

US 2005/0287062 A1    Dec. 29, 2005

(51) Int. Cl.
B01D 15/08    (2006.01)
C01B 33/14    (2006.01)
G01N 30/02    (2006.01)

(52) U.S. Cl. .............. 210/656; 210/198.2; 423/335; 436/161

(58) Field of Classification Search .......... 423/335, 423/338; 436/161; 210/192, 656, 198.2; 95/88; 556/443
See application file for complete search history.

(56) References Cited

U.S. PATENT DOCUMENTS

| | | | |
|---|---|---|---|
| 4,341,634 A * | 7/1982 | Matsushita et al. | 210/656 |
| 4,743,377 A * | 5/1988 | Ohtsu et al. | 210/635 |
| 4,830,921 A * | 5/1989 | Kitayama et al. | 428/406 |
| 5,051,176 A * | 9/1991 | Miyano et al. | 210/198.2 |
| 5,128,114 A * | 7/1992 | Schwartz | 423/335 |
| 5,135,649 A * | 8/1992 | Kanda et al. | 210/198.2 |
| 5,559,039 A * | 9/1996 | Williams | 436/161 |
| 5,587,082 A * | 12/1996 | Teraoka et al. | 210/635 |
| 6,074,555 A * | 6/2000 | Boos et al. | 210/198.2 |
| 6,359,113 B1 * | 3/2002 | Ramage et al. | 530/335 |
| 6,360,589 B1 * | 3/2002 | Kanda et al. | 73/61.52 |
| 7,109,377 B2 * | 9/2006 | Schreiber et al. | 564/191 |
| 2002/0043462 A1 * | 4/2002 | Ivory et al. | 204/450 |
| 2002/0058286 A1 * | 5/2002 | Danishefsky et al. | 435/7.1 |
| 2002/0058817 A1 * | 5/2002 | Danishefsky et al. | 546/281.7 |
| 2002/0128490 A1 * | 9/2002 | Johnston et al. | 548/483 |

(Continued)

FOREIGN PATENT DOCUMENTS

WO    WO9204976 A    4/1992

OTHER PUBLICATIONS

SUPELCO, Guide to Solid Phase Extraction, 1998, Sigma-Aldrich Co., Bulletin 910, pp. 1-12.*

(Continued)

*Primary Examiner*—Wayne Langel
*Assistant Examiner*—Brittany M Martinez
(74) *Attorney, Agent, or Firm*—Pehr B. Jansson; The Jansson Firm

(57) ABSTRACT

A column for flash chromatography having spherical, or semi-spherical, and porous silica gel having a granule size between 3 and 45 µm and pores between 30 and 300 Å.

18 Claims, 3 Drawing Sheets

U.S. PATENT DOCUMENTS

Figure 1:
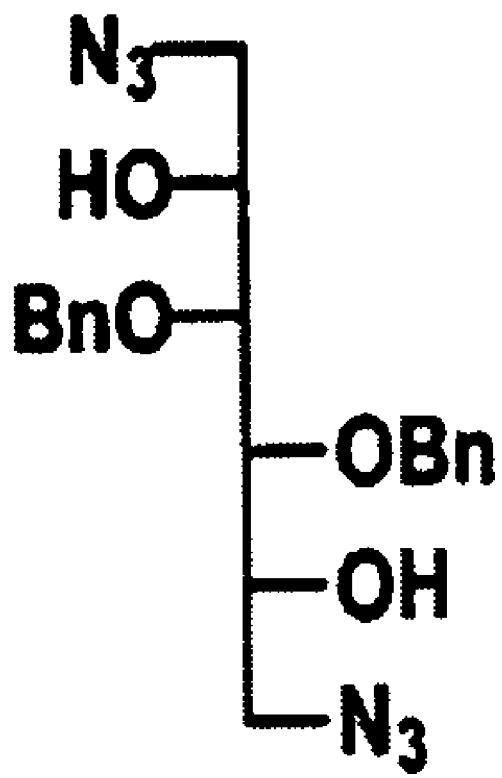

2003/0220330 A1* 11/2003 Yoshitaka et al. ......... 514/227.8
2004/0018260 A1* 1/2004 Ren et al. ................... 424/773

OTHER PUBLICATIONS

Koh et al., "Consolidation and column performance of several packing materials for liquid chromatography in a dynamic axial compression column," 1998, Journal of Chromatography A, 813, pp. 223-238.*

Kazue Tani et al., "Effect of pore size on the surface exces isotherm of silica packings," 1990, Journal of Chromatography, 515, pp. 159-168.*

Kamegawa et al., "Carbon Coating of Silica Surface," 1995, Journal of Colloid and Interface Science, 172, pp. 94-97.*

Sigma Aldrich, "Silica gel," Dec. 15, 2009.*

Fuji Silysia Chemical LTD: "Silica Gel for Flash Chromotography", Technical Bulletin, 'OnLine!, Sep. 2000, pp. 1-3, XP002198180, retreived from URL <http://www.fuji-silysia.co.jp/e-f160.htm>, whole document.

Cheng et al, "Analysis of the enzymatic raceimization of d-aspartic acid to l-aspartic acid by the on-line coupling of a solid phase extracting column and a ligand-exchange high-performance liquid chromatography column", Journal of Chromatography, Elsevier Science Publishers B.V. Amsterdam, NL, vol. 896, No. 1-2, Oct. 27, 2000, pp. 299-310 ISSN: 0021-9673, p. 301, left hand column line 7-10.

Still Wc et al, "Rapid chromatographic technique for preparative separations with moderat resolution", Journal of Organic Chemistry, American Chemical Society, Easton US, vol. 43, No. 14, 1978, pp. 2923-2925, ISSN: 002-3263, whole document.

M. Watanabe et al., Structure of a New Glycolipid from the *Mycobacterium avium-Mycobacterium intracellulare* Complex, Journal of Bacteriology, Apr. 1999, p. 2293-2297, Vol American Society for Microbiology, Washington DC.

* cited by examiner

PRE-FILLED COLUMNS FOR FLASH CHROMATOGRAPHY WITH HIGHER SEPARATING EFFICIENCY

BACKGROUND OF THE INVENTION

1. Field of the Invention

The present invention relates to pre-filled columns for flash chromatography. These columns, which are filled with spherical and porous silica gel or with semi-spherical and porous silica gel, allow a considerable increase in the quality of the purification of synthetic products by means of flash chromatography.

The technique of flash chromatography can particularly be applied to the fast purification under low and medium pressure of synthetic products in pharmaceutical, cosmetic, agrochemical and biotechnology research.

2. State of the Art of Flash Chromatography

The technique of chromatography was discovered more than 100 years ago by a Russian chemist named TSWETT. This chemist described the separating power of alumina oxide placed in a glass column on which he deposited chlorophyll. He observed the descending migration of color rings along the glass column.

Since his discovery, numerous analytical, preparative, and industrial applications have been developed.

Gas chromatography (GC) and high performance liquid chromatography (HPLC) can be cited as being among the most important applications. Flash chromatography was born from the need to purify synthetic products rapidly and simply in a laboratory context and in quantities comprised between 10 mg to 100 g.

Flash chromatography differs from preparative HPLC in the particle size of the silica gel granules, namely the granules are bigger in flash chromatography, and provide a simpler and more rapid application of flash chromatography.

Pre-filled flash chromatography columns filled with irregular porous silica gel having particle size of 40-60 μm or 20-40 μm, have been on the market for several years. These new chromatography columns brought an enhanced ease of use through immediate application. However, these columns did not bring any advantage in terms of the quality of separation.

SUMMARY OF THE INVENTION

In the invention described herein, the separating properties of flash chromatography columns have been increased significantly, while maintaining the ease of use of the technique combined with a low working counter-pressure.

DETAILED DESCRIPTION OF THE INVENTION

According to one aspect of the invention, there are provided columns for flash chromatography with spherical and porous silica gel having particle size between 3 and 45 μm and pores between 30 and 300 Å. According to another aspect of the invention, there are provided columns for flash chromatography with semi-spherical and porous silica gel having particle size between 3 and 45 μm and pores between 30 and 300 Å.

A pre-filled column for flash chromatography is manufactured by filling a tube or a syringe or any other suitable body, on which a frit (filter) is attached to prevent the silica gel from leaving.

A quantity of spherical and porous silica gel or of semi-spherical and porous silica gel is poured.

A second frit is then placed with force on top of the bed that has been created.

In order to have good homogeneity in the filling of the tube, syringe or other suitable body and to eliminate preferential paths that are detrimental to the technique, the column is made to vibrate while, at the same time, the upper frit is pushed by means of an appropriate object so as to achieve a homogenous compression on the entire surface of the frit.

A homogenous packing can also be obtained though use of liquids or gasses.

After the dead volume has been reabsorbed, the flash chromatography column is ready for use.

It is possible to improve the quality of the compression by passing a solvent through the column until the upper bed of the column has stabilized.

Example 1

A column for flash chromatography is manufactured with 50 g of spherical and porous silica gel having particle size of 25-40 μm.

Column length: 85 mm.

Silica gel: 50 g of spherical and porous silica gel of 70 Å pore size.

Recipient: syringe body of 150 ml volume and a diameter of 37 mm

Take the 150 ml syringe body and place a porous frit in the bottom of the syringe body.

Pour 50 g of spherical and porous silica gel in the column.

Add a second porous frit on top of silica bed.

Press on the top frit while vibrating the whole with vibrator or a vibrating table.

Wait until the bed has stabilized and does not move downwards.

a) Results Obtained

Operational Conditions:

Eluent: Ethyl acetate/Hexane.

Flow: 35 ml/min.

Detection: UV 254 nm

Gradient: A: Hexane/B: Ethyl acetate.

FIG. 1 illustrates the main substance that has been injected.

| Time | % A | % B |
| --- | --- | --- |
| 0 | 100 | 0 |
| 5 | 100 | 0 |
| 5.1 | 90 | 10 |
| 10 | 90 | 10 |
| 10.1 | 80 | 20 |
| 15.0 | 80 | 20 |
| 15.1 | 70 | 30 |
| 25 | 70 | 30 |

Figure 2:
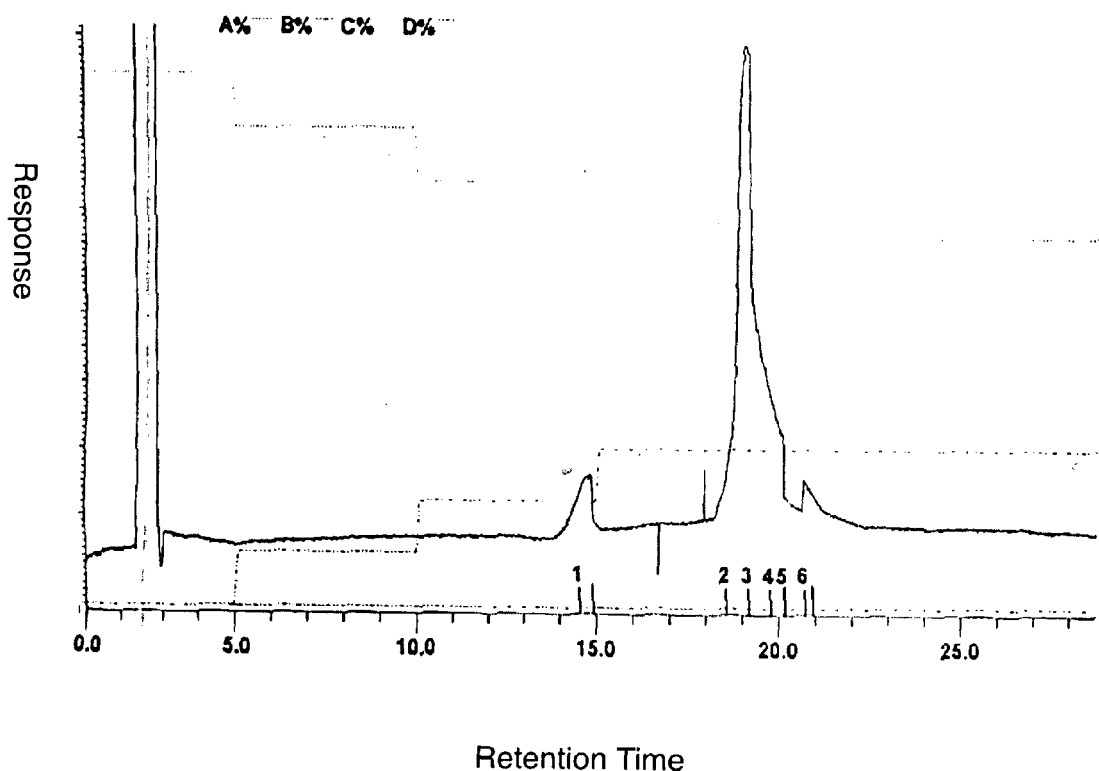

FIG. 2. illustrates the chromatogram obtained.

Number of plates on the main peak: 684.

K': 10.

Working pressure: 16 psi.

Asymmetry of main peak: 1.75.

Figure 3:
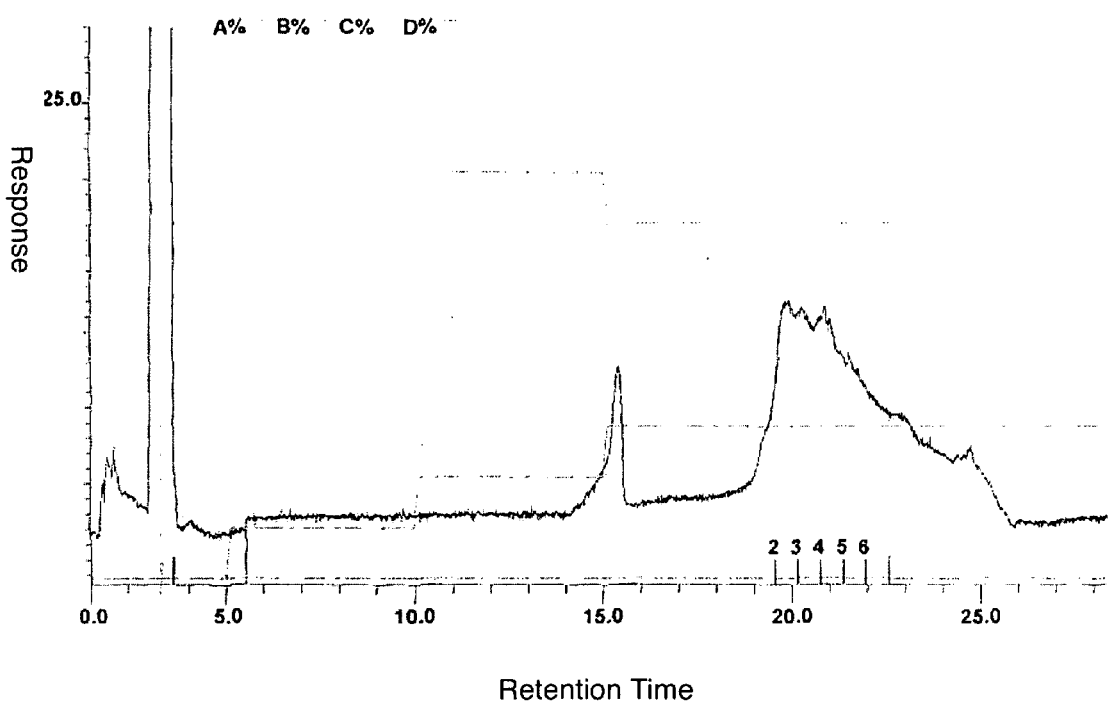

FIG. 3 shows, for the purpose of comparison, a chromatogram of a same column and in the same conditions, but filled with irregular silica gel, having particle size of 15-35 μm, in accordance with the prior art.

Number of plates of the main peak: 156.

K': 10.5.

Working pressure: 43 psi.

Asymmetry of main peak: 5.88.

c) Comparative Table

|  | Column with spherical and porous silica gel | Column with irregular and porous silica gel |
|---|---|---|
| Number of plates | 684 | 156 |
| K' | 10 | 10.5 |
| Working pressure | 16 psi | 43 psi |
| Asymmetry of the main peak | 1.75 | 5.88 |

Although specific embodiments of the invention have been described and illustrated, the invention is not to be limited to the specific forms or arrangements of parts so described and illustrated. The invention is limited only by the claims.

The invention claimed is:

1. A method for purifying a product comprising:
   performing a flash chromatography process by:
   introducing an eluent with at least one product to be purified into a flash chromatography column pre-filled with a spherical and porous silica gel having particle size between 3 and 45 µm and pores between 30 and 300 Å;
   causing the eluent to flow through the pre-filled column; and
   obtaining a separation of the at least one product to be purified.

2. The method of purifying a product of claim 1 wherein the flash chromatography column contains between 10 mg to 1 kg of the spherical and porous silica gel.

3. The method for purifying a product according to claim 1 wherein the flash chromatography column is adapted to purify synthetic products in quantities comprised between 10 mg to 100 g.

4. A method for purifying a product comprising:
   performing a flash chromatography process by:
   introducing an eluent with at least one product to be purified into a flash chromatography column pre-filled with a semi-spherical and porous silica gel having particle size between 3 and 45 µm and pores between 30 and 300 Å;
   causing the eluent to flow through the pre-filled column; and
   obtaining a separation of the at least one product to be purified.

5. The method for purifying a product of claim 4 wherein the flash chromatography column contains between 10 mg to 1 kg of the semispherical and porous silica gel.

6. The method for purifying a product according to claim 4 wherein the flash chromatography column is adapted to purify synthetic products in quantities comprised between 10 mg to 100 g.

7. A pre-filled flash chromatography column for purifying a product, comprising
   a plastic tube or syringe body; and
   spherical and porous raw silica gel having particle size predominantly between 3 and 45 µm and pores between 30 and 300 Å placed inside the plastic tube or syringe body.

8. The pre-filled flash chromatography column according to claim 7 wherein the flash chromatography column contains between 10 mg to 1 kg of the spherical and porous silica gel.

9. The pre-filled flash chromatography column according to claim 7 adapted to purify synthetic products in quantities comprised between 10 mg to 100 g.

10. A pre-filled flash chromatography column for purifying a product, comprising
    a plastic tube or syringe body; and
    semi-spherical and porous raw silica gel having particle size predominantly between 3 and 45 µm and pores between 30 and 300 Å placed inside the plastic tube or syringe body.

11. The pre-filled flash chromatography column according to claim 10 wherein the flash chromatography column contains between 10 mg to 1 kg of the semispherical and porous silica gel.

12. The pre-filled flash chromatography column according to claim 10 adapted to purify synthetic products in quantities comprised between 10 mg to 100 g.

13. A pre-filled flash chromatography column for purifying a product, comprising a low-pressure glass tube or syringe body; and
    spherical and porous raw silica gel having particle size predominantly between 3 and 45 µm and pores between 30 and 300 Å placed inside the low-pressure glass tube or syringe body.

14. The pre-filled flash chromatography column according to claim 13 wherein the flash chromatography column contains between 10 mg to 1 kg of the spherical and porous silica gel.

15. The pre-filled flash chromatography column according to claim 13 adapted to purify synthetic products in quantities comprised between 10 mg to 100 g.

16. A pre-filled flash chromatography column for purifying a product, comprising
    a low-pressure glass tube or syringe body; and
    semi-spherical and porous raw silica gel having particle size predominantly between 3 and 45 µm and pores between 30 and 300 Å placed inside the low-pressure glass tube or syringe body.

17. The pre-filled flash chromatography column according to claim 16 wherein the flash chromatography column contains between 10 mg to 1 kg of the semi-spherical and porous silica gel.

18. The pre-filled flash chromatography column according to claim 16 adapted to purify synthetic products in quantities comprised between 10 mg to 100 g.

* * * * *